(12) United States Patent
Yamakita

(10) Patent No.: US 7,916,175 B2
(45) Date of Patent: Mar. 29, 2011

(54) DIGITAL CAMERA INCLUDING AN ELECTRONIC TAG READER WHICH WIRELESSLY WRITES IMAGE DATA INTO AN ELECTRONIC TAG, SYSTEM INCLUDING THE DIGITAL CAMERA, ELECTRONIC TAG READING APPARATUS WHICH READS DATA INCLUDING IMAGE DATA FROM AN ELECTRONIC TAG, ELECTRONIC TAG READ/WRITE METHOD FOR A DIGITAL CAMERA AND ELECTRONIC TAG READING METHOD FOR AN ELECTRONIC TAG READER

(75) Inventor: Tooru Yamakita, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 588 days.

(21) Appl. No.: 10/551,947

(22) PCT Filed: Mar. 2, 2005

(86) PCT No.: PCT/JP2005/004030
§ 371 (c)(1),
(2), (4) Date: Oct. 5, 2005

(87) PCT Pub. No.: WO2005/086084
PCT Pub. Date: Sep. 15, 2005

(65) Prior Publication Data
US 2006/0197838 A1    Sep. 7, 2006

(30) Foreign Application Priority Data

Mar. 3, 2004  (JP) ................................ 2004-059858

(51) Int. Cl.
*H04N 5/225* (2006.01)
(52) U.S. Cl. .................................................. 348/207.99
(58) Field of Classification Search .................. None
See application file for complete search history.

(56) References Cited

U.S. PATENT DOCUMENTS 4,703,347 A    10/1987  Yasuda et al.
(Continued)

FOREIGN PATENT DOCUMENTS

CA    2384675 A1    3/2001
(Continued)

OTHER PUBLICATIONS

Notification Concerning Transmittal of International Preliminary Report on Patentability, Chapter I of the Patent Cooperation Treaty, and Written Opinion of the International Searching Authority, dated Sep. 14, 2006, for PCT/JP2005/004030, 6 sheets.

(Continued)

*Primary Examiner* — Justin P Misleh
(74) *Attorney, Agent, or Firm* — Holtz, Holtz, Goodman & Chick, PC

(57) ABSTRACT

An image pickup apparatus includes an image capture device which captures an image of an article, an electronic tag reader which reads electronic tag information from an electronic tag, and a writing device. When the image of the article is captured by the image capture device, the electronic tag reader reads electronic tag information from the electronic tag, and the writing device writes the image of the article captured by the image capture device into the electronic tag.

5 Claims, 8 Drawing Sheets

U.S. PATENT DOCUMENTS

| | | | |
|---|---|---|---|
| 5,095,196 A | 3/1992 | Miyata | |
| 6,056,199 A | 5/2000 | Wiklof et al. | |
| 6,321,986 B1 | 11/2001 | Ackley | |
| 6,371,375 B1 | 4/2002 | Ackley et al. | |
| 6,422,476 B1 | 7/2002 | Ackley | |
| 7,327,383 B2 * | 2/2008 | Valleriano et al. | 348/143 |
| 7,333,001 B2 * | 2/2008 | Lane et al. | 340/10.1 |
| 2003/0095032 A1 * | 5/2003 | Hoshino et al. | 340/5.92 |
| 2004/0080530 A1 * | 4/2004 | Lee | 345/738 |
| 2005/0103840 A1 * | 5/2005 | Boles | 235/385 |

FOREIGN PATENT DOCUMENTS

| | | |
|---|---|---|
| CN | 1373885 A | 10/2002 |
| DE | 42 41 880 A1 | 6/1994 |
| EP | 0 917 083 A2 | 5/1999 |
| EP | 1 755 065 A2 | 2/2007 |
| JP | 6-180751 A | 6/1994 |
| JP | 2002-24229 A | 1/2002 |
| JP | 2003-256795 A | 9/2003 |
| JP | 2003-263611 A | 9/2003 |
| WO | WO 01/20564 A1 | 3/2001 |

OTHER PUBLICATIONS

Chinese Office Action (and English translation thereof) dated Sep. 26, 2008, issued in a counterpart Chinese Application.

Japanese Office Action dated December 16, 2008 (4 pages), and English translation thereof (5 pages), issued in counterpart Japanese Application No. 2004-059858.

European Office Action dated Sep. 3, 2010 (in English) in counterpart European Application No. 05720302.8.

* cited by examiner

FIG.5

| ID CODE 51 | TAG INFORMATION 52 | IMAGE WRITE DATE AND TIME 53 | IMAGE INFORMATION 54 |
|---|---|---|---|

FIG.6

| ID CODE 61 | IMAGE WRITE DATE AND TIME 62 | IMAGE INFORMATION 63 | REWRITE FLAG 64 |
|---|---|---|---|

DIGITAL CAMERA INCLUDING AN ELECTRONIC TAG READER WHICH WIRELESSLY WRITES IMAGE DATA INTO AN ELECTRONIC TAG, SYSTEM INCLUDING THE DIGITAL CAMERA, ELECTRONIC TAG READING APPARATUS WHICH READS DATA INCLUDING IMAGE DATA FROM AN ELECTRONIC TAG, ELECTRONIC TAG READ/WRITE METHOD FOR A DIGITAL CAMERA AND ELECTRONIC TAG READING METHOD FOR AN ELECTRONIC TAG READER

This application is a U.S. National Phase Application under 35 USC 371 of International Application PCT/JP2005/004030 filed Mar. 2, 2005.

TECHNICAL FIELD

This invention relates to an image pickup apparatus which captures an image of an article and a data processing apparatus which processes the captured image.

BACKGROUND ART

In recent years, electronic tags, including RFID (Radio Frequency ID), have been popularized instead of such tags as bar codes. With the popularization of electronic tags, a method of attaching electronic tags to various articles and managing the articles has been proposed and realized.

One of the advantages of electronic tags is that bringing an electronic tag reader/writer close to an electronic tag causes them to communicate with each other by radio even if the reader/write is not brought into direct contact with the electronic tag, thereby enabling the information in the electronic tag (hereinafter, referred to as electronic tag information) to be read and written. Moreover, since electronic tags enable information to be read and written via radio communication, electronic tag information can be read from and written into a plurality of electronic tags at the same time. As described above, the exchange of information between an electronic tag and a tag reader/writer is carried out via radio communication. In addition, the tag reader/writer, when there are a plurality of electronic tags around it, may read electronic tag information from them simultaneously.

In such a case, it is difficult to determine from which electronic tag the read-out electronic tag information was read. In the case of bar codes, the reader is touched directly to the bar code of an article to be read, thereby reading the bar code, which enables the operator to check the bar-code-attached article. However, in the case of electronic tags, since the electronic tag information is read using radio communication, it may be impossible to determine from which electronic tag attached to an article the read-out electronic tag information was read. Moreover, even when there is only one type of electronic tag, if there are a plurality of articles and it is unknown which articles have electronic tags, it is impossible to determine which article the read-out electronic tag information is related to.

DISCLOSURE OF INVENTION

It is an object of the present invention to provide the technique for making it easy to determine which article read-out electronic tag information is related to.

According to one embodiment of the invention, information is read from the electronic tag attached to an article and an image of the article is stored into the electronic tag.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF DRAWINGS

The accompanying drawings, which are incorporated in and constitute a part of the specification, illustrate embodiments of the present invention and, together with the general description given above and the detailed description of the embodiments given below, serve to explain the principles of the present invention in which:

FIG. 5 shows a configuration of electronic tag information stored in the electronic tag attached to an article to be managed;

FIG. 6 shows a configuration of a record stored in a database;

BEST MODE FOR CARRYING OUT THE INVENTION

Hereinafter, referring to the accompanying drawings, an embodiment of the present invention will be explained.

Figure 1:
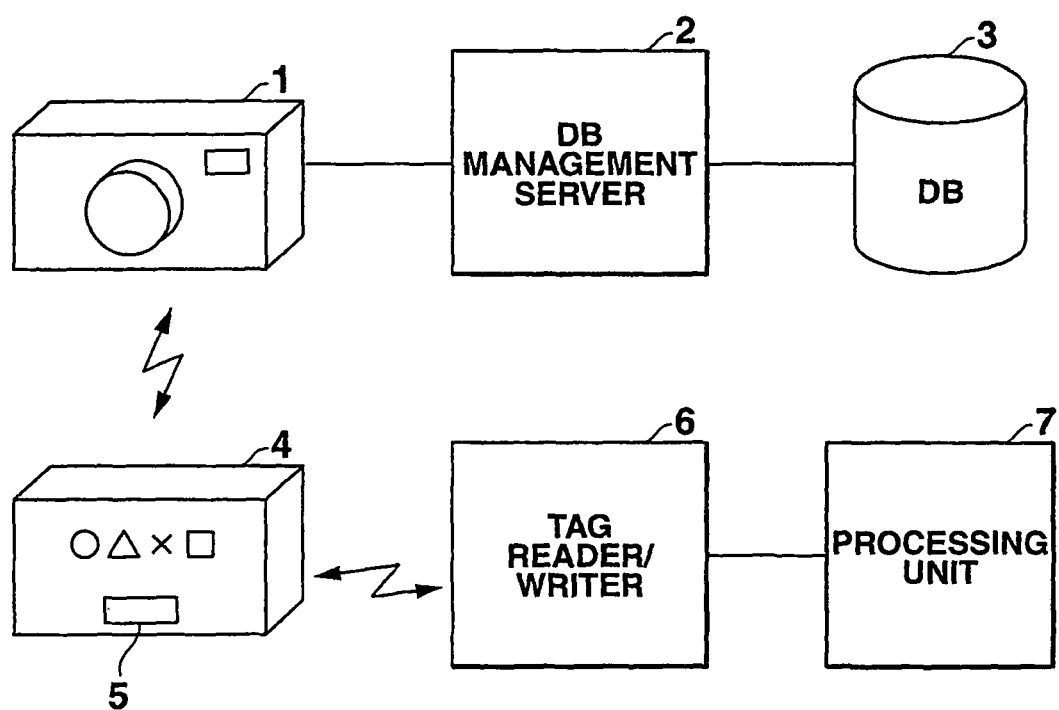
FIG. 1 is a schematic diagram showing the overall configuration of a system according to an embodiment of the present invention.

FIG. 1 is a schematic diagram showing the overall configuration of a system according to the embodiment.

Generally, management using electronic tags is performed as follows. A tag reader/writer 6 is brought close to an article 4 to which an electronic tag 5 is attached, thereby reading management information stored as electronic tag information; then the read-out management information is subjected to a relation process at a processor unit 7; and the result of the process is written into an electronic tag 5 by the tag reader/writer 6.

In the embodiment, however, before the tag reader/writer 6 and processor unit 7 carry out processes, for example, before articles are displayed in a case where the articles are managed using electronic tags 5, an image of the articles 4 to which electronic tags 5 have been attached is captured with an image pickup apparatus 1, such as a digital camera.

The image pickup apparatus 1 of the embodiment has the function of reading and writing information from and into the electronic tags 5. When capturing image, the image pickup apparatus 1 reads electronic tag information from the electronic tag 5 and causes the read-out electronic tag information and the captured image data to relate to each other in a database 3, thereby managing the information. At this time, the image pickup apparatus 1 requires a database management server 2 for permission to write image data. If having obtained permission, the image pickup apparatus 1 writes image data into the electronic tag 5.

In this state, when the tag reader/writer 6 is brought close to an article displayed, not only the management information but also the image data of the article are read as electronic tag information. On the basis of the image data, an image is displayed. As a result, the electronic tag information read by the tag reader/writer 6 is displayed together with the image, which enables the operator to easily recognize which article the read-out electronic tag information is related to.

Figure 2:
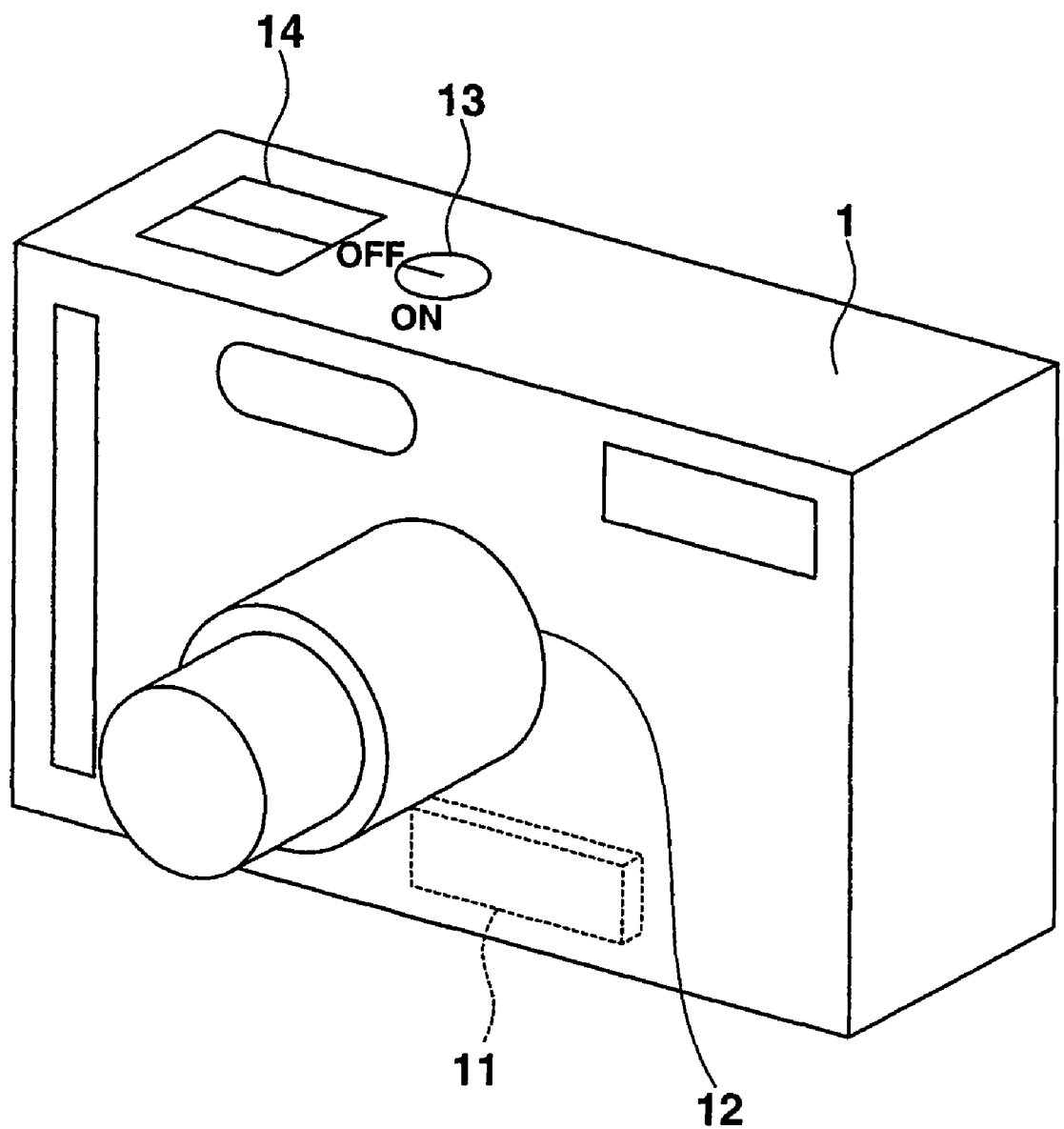
FIG. 2 is a schematic diagram of an image pickup apparatus according to the embodiment.

FIG. 2 is a schematic diagram of the image pickup apparatus 1 used to capture image of articles in the embodiment.

The image pickup apparatus 1 of FIG. 2 includes a tag reader/writer 11 and a mode switch 13.

The tag reader/writer 11 is for reading and writing the electronic tag information from and into an electronic tag 5.

The mode switch 13 is for switching between the ON and OFF states of the image write mode. When the mode switch 13 is in the OFF state of the image write mode, the image pickup apparatus 1 functions as an normal image pickup apparatus, such as a digital camera. When the mode switch 13 is set in the ON state of the image write mode, the image pickup apparatus 1 writes image data of the articles and registers it in the database as explained later.

With the mode switch 13 in the ON state of the image write mode, when a shutter button 14 is pressed, the image pickup apparatus 1 of FIG. 2 captures the image. At the same time, the tag reader/writer 11 sends a radio wave in the direction in which an objective lens 12 looks. Then, receiving a radio wave as response from the electronic tag 5 attached to the article, the image pickup apparatus 1 relates the obtained electronic tag information to the image data of the article and stores the resulting information. Next, the image pickup apparatus 1 registers the image data in the database management server 2 and requires the server 2 for permission to rewrite the image data. When obtaining permission, the image pickup apparatus 1 writes the image data of the article into the electronic tag 5.

As a result, when the electronic tag information is read from the electronic tag 5 by the tag reader/writer 6, since the image data about the article is stored as electronic tag information in the electronic tag 5, the image data is displayed on the reader/writer 6, which enables the operator to easily recognize which article the read-out electronic tag information is related to.

Figure 3:
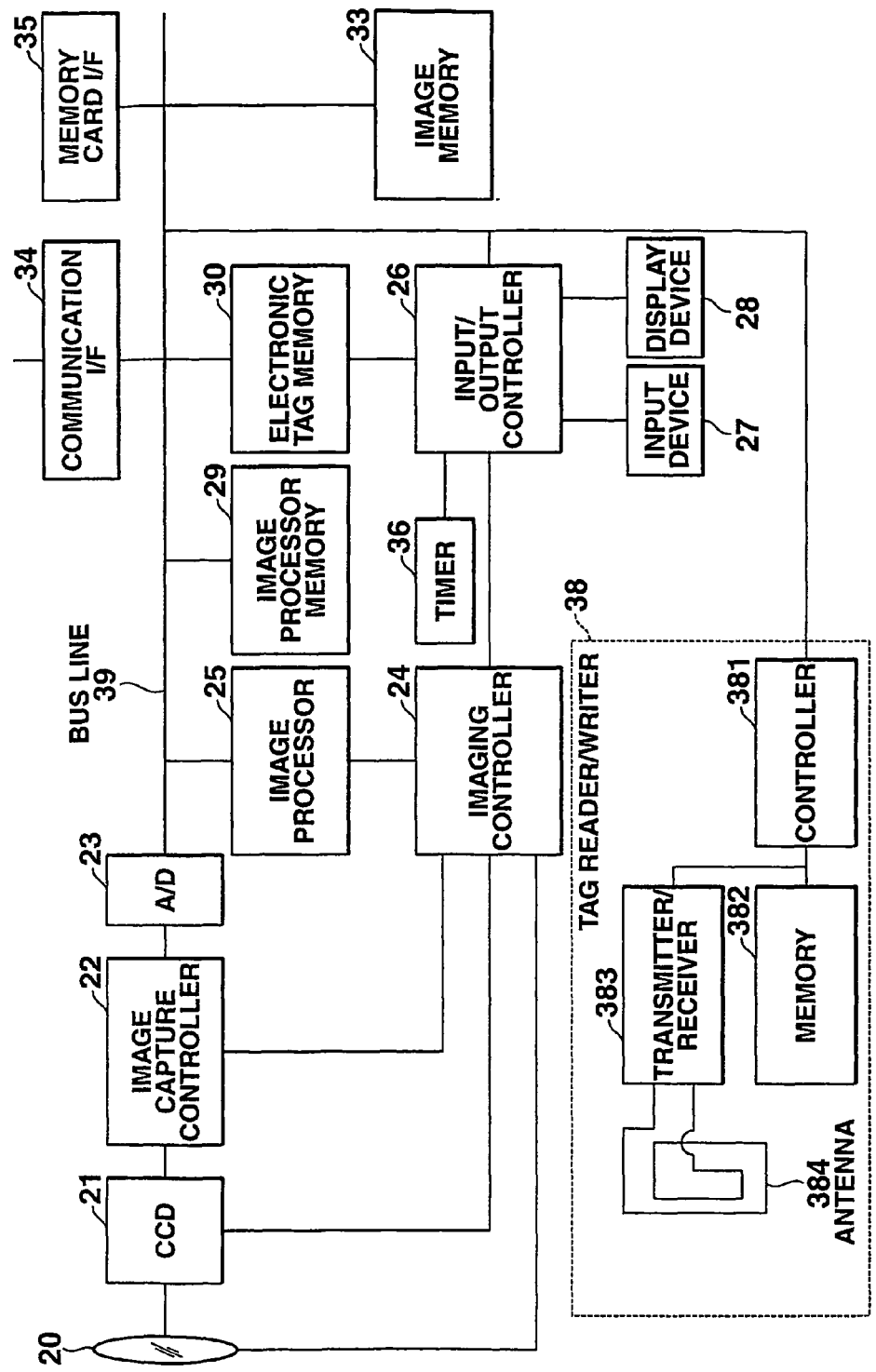
FIG. 3 is a block diagram of an internal configuration of the image pickup apparatus.

FIG. 3 is a block diagram showing an internal configuration of the image pickup apparatus 1 of FIG. 2.

In the image pickup apparatus 1 of FIG. 3, an A/D converter 23, an image processor 25, an input/output controller 26, an image processor memory 29, an electronic tag memory 30, an image memory 33, a communication interface 34, a memory card interface 35, and a tag reader/writer 38 are connected to one another via a bus line 39 in such a manner that they can exchange data with one another via the bus line 39.

An objective lens unit 20 is composed of an optical lens made of glass or plastic and its driving unit. Under the control of an imaging controller 24, the objective lens is driven along the optical axis to focus or realize a zoom function. A CCD 21, which is for converting an optical signal into an electric signal, photoelectrically converts the optical image of the article formed via the lens 20 and outputs an analog pickup signal according to the optical image of the article. Under the control of the imaging controller 24, an image capture processor 22 amplifies the analog signal input from the CCD 21, samples the amplified signal, and outputs the resulting signal to the A/D converter 23. The A/D converter 23 is for converting the analog signal input from the image capture processor 22 into a digital signal. The imaging controller 24 controls the process of image capture in the image pickup apparatus 1. The imaging controller 24 executes a program stored inside, thereby controlling the lens unit 20 to focus or realize a zoom function or controlling the CCD 21 or the image capture processor 22 to realize a capture function, including recording the captured image data into an image memory 33. When an image capture is done, the image processor 25 articles the output of the A/D converter 25 to an image process, taking into account various photographic conditions previously set. Thereafter, the image processor 25 articles the resulting output to a compression process, thereby creating image data of the article. Furthermore, the image processor 25 stores in the image processor memory 29 synthesis image data by combining through image data of the article output from the A/D converter 23 with the information in the electronic tag memory 30.

The input/output controller 26 executes a program stored inside, thereby controlling various processes of the commands input by the operator from an input device 27 and the process of displaying a through image or various pieces of information to be displayed on a display device 28. The input device 27, which enables the operator to perform operation using switches, is composed of a plurality of operation keys, including a shutter button, a power key, a mode select key, a cross key, and a decision key. The input device 27 outputs a key input signal corresponding to the operator's key operation to the input/output controller 26. The display device 28, which includes a color LCD and its driving circuit, displays an article image captured by the CCD 21 as a through image or displays a captured image stored in the image memory 33 or in a memory card. The image processor memory 29 is a memory which stores the image data subjected to an image process by the image processor 25. On the basis of the image data in the image processor memory 29, the input/output controller 26 causes the display device 28 to display an image or stores the captured image data into the image memory 33. The electronic tag memory 30 is a memory which stores the information read from an electronic tag 5 by the tag reader/writer 38. The image memory 33 is a memory which stores data about a plurality of captured images from the image pickup apparatus 1. The communication interface 34 is an interface which is connected to an external device and a network and exchanges data with them. In addition, the communication interface 34 has the function of exchanging data with the database management server 2 via wire communication or wireless communication. The memory card interface 35 is an interface on which a memory card for storing image data is mounted. According to the operator's instruction, the input/output controller 26 transfers the image data in the image memory 33 to the memory card mounted on the memory card interface 35. A timer 36 clocks the date and time. The input/output controller 26 sets the date and time clocked by the timer 36 as the system date and time.

The tag reader/writer 38, which accesses an electronic tag 5 under the control of the input/output controller 26, includes a controller 381, a memory 382, a transmitter/receiver 383, and an antenna 384.

When the shutter button 14 is pressed, the input/output controller 26 instructs not only the imaging controller 24 to capture image but also the tag reader/writer 38 to read an electronic tag 5. When receiving the read instruction from the input/output controller 26, the controller 381 causes the transmitter/receiver 383 to transmit a radio wave and then causes the transmitter/receiver 383 to convert the radio wave received as a response into digital data. Thereafter, the controller 381 stores the digital data into the memory 382. When being requested by the input/output controller 26 to supply the data read from the electronic tag 5, the controller 381 transfers the data stored in the memory 382 to the electronic tag memory 30. To write electronic tag information into an electronic tag 5, when the input/output controller 26 issues an instruction to the tag reader/writer 38, the controller 381 transfers the data set in the electronic tag memory 30 to the memory 382 and causes the transmitter/receiver 383 to transmit the radio wave obtained by converting the data in the memory 382.

Figure 4:
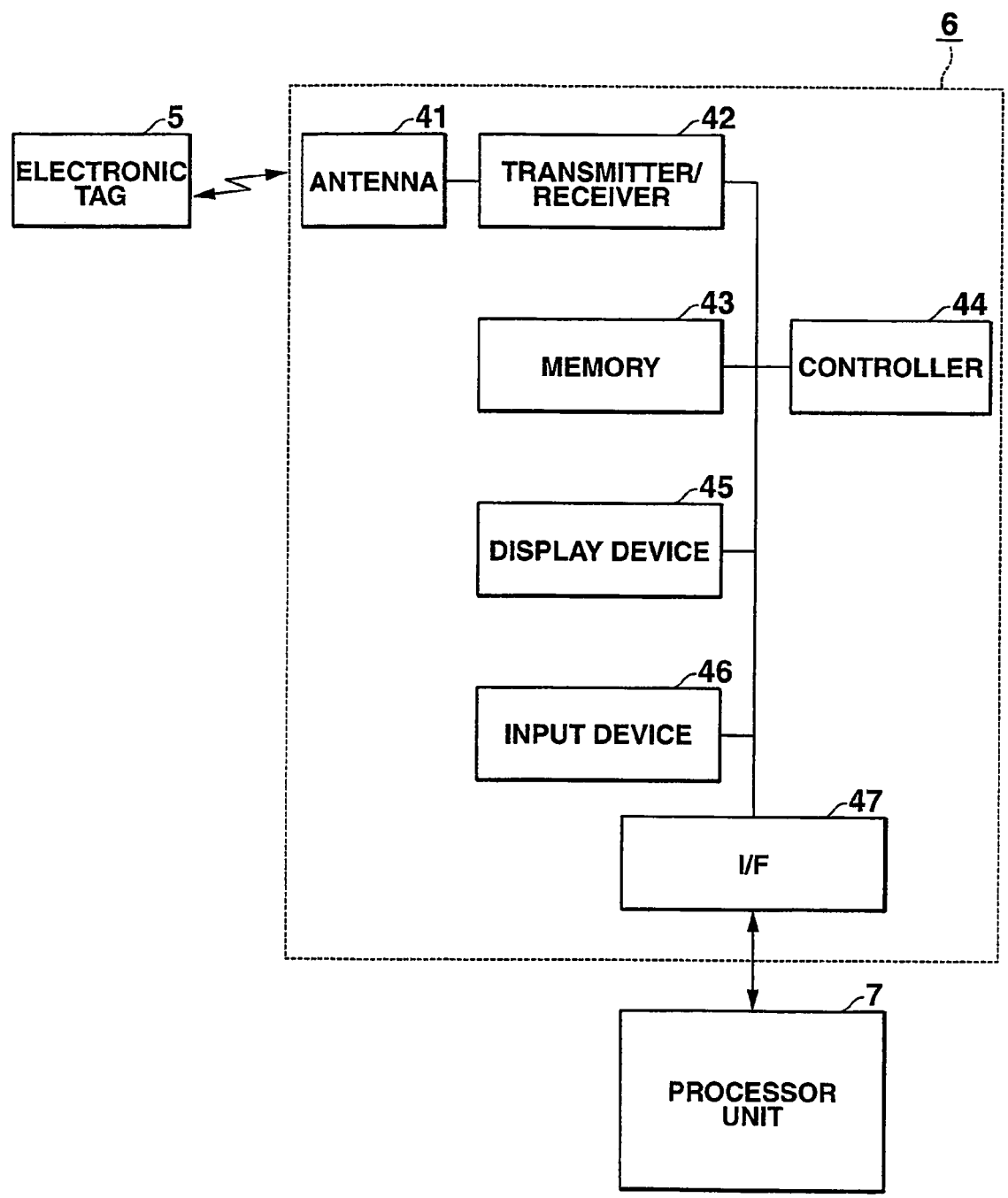
FIG. 4 is a block diagram showing a configuration of the tag reader/writer.

FIG. 4 is a block diagram showing a configuration of the tag reader/writer 6.

In the configuration of FIG. 4, the tag reader/writer 6 includes an antenna 41, a transmitter/receiver 42, a memory 43, a controller 44, a display device 45, an input device 46, and an interface 47.

The antenna 41 is a transmission/reception antenna for wireless communication with the electronic tag 5. The transmitter/receiver 42 causes the conversion of a radio wave into data or vice versa, thereby realizing wireless communication. When receiving an instruction from the controller 44, the transmitter/receiver 42 converts the data stored in a specified location of the memory 43 into a transmission radio wave and transmits it from the antenna 41 to the outside. Moreover, the transmitter/receiver 42 converts the radio wave received by the antenna 41 into digital data and stores the data into a specific location of the memory 43. The memory 43 is a memory used as a work memory for the controller 44, a transmission/reception data buffer, a video memory for the display device 45, and the like.

The controller 44 performs control of various component elements constituting the tag reader/writer 6 of FIG. 4 on the basis of the program stored inside. The controller 44 causes not only the transmitter/receiver 42 to transmit write data to the electronic tag 5 but also the display device 45 to display image data or the like on the basis of the received data from the electronic tag 5. The controller 44 further transmits data to the processor unit 7 via the interface 47. The display device 45 displays various pieces of information to be notified to the user. When image data is included in the electronic tag information read from the electronic tag 5, the tag reader/writer 6 of the embodiment displays an image of the article on the basis of the image data. Seeing the image, the operator can easily recognize which article the read-out electronic tag information is related to. The input device 46, which enables the operator to input various instructions to the tag reader/writer 6, is composed of a keyboard, a pointing device, and the like. On the basis of the instruction from the input device 46, the controller 44 controls the individual component elements. The interface 47 is an interface which controls communication connection with the processor unit 7.

When having read the electronic tag information from the electronic tag 5, the tag reader/writer 6 determines whether image data is included in the electronic tag information. If image data is included in the tag information, the tag reader/writer 6 displays an image on the display device 45 on the basis of the image data. This enables the operator operating the tag reader/writer 6 to easily determine from which electronic tag 5 attached to an article the read-out electronic tag information is read, seeing the displayed image, even if there are a plurality of articles in a position where the tag reader/writer 6 will possibly read electronic tag information. As a result, a suitable process can be carried out.

FIG. 5 shows a configuration of electronic tag information which is stored in the electronic tag 5 attached to an article to be managed and which can be read and written by the image pickup apparatus 1 or the tag reader/writer 6.

In the electronic tag 5, an ID code 51, tag information 52, image write date and time 53, and image information 54 are stored as electronic tag information.

The ID code 51 is an identifier which identifies each electronic tag 5 uniquely. The tag information 52, which shows various pieces of management information about the articles to which the electronic tags are attached, includes information to identify an article, such as a product name, a product code, a serial number, or manufacturer identifying information, and information to manage the time limit, such as the date of manufacture. The image write date and time 53 is information indicating the date and time when image information 54 was written into the electronic tag 5. The image information 54 is image data about an article of which image was captured by the image pickup apparatus 1 and to which the electronic tag 5 is attached.

When receiving an electronic tag information reading request by radio from the tag reader/writer 38 of the image pickup apparatus 1, the electronic tag 5 sends back the ID code 51 and tag information 52 as response by radio. As described later, the image pickup apparatus 1 instructs the electronic tag 5 to write date and time information that indicates the date and time when the image data about the captured image and the image data were written into the electronic tag 5. In response to the instruction, the electronic tag 5 writes the reception date and time information as the image write date and time 53 and the image data as image information 54 into its own memory.

Furthermore, when receiving an electronic tag information reading request by radio from the tag reader/writer 6, the electronic tag 5 sends back the ID code 51, tag information 52, image write date and time 53, and image information 54 as electronic tag information to the tag reader/writer 6.

FIG. 6 shows a configuration of a record stored in the database 3.

In the configuration of FIG. 6, an ID code 61, image write date and time 62, image information 63, and a rewrite flag 64 are stored in the record. The ID code 61, image write date and time 62, and image information 63 correspond to the ID code 51, tag information 52, and image information 54 stored in the electronic tag 5 of FIG. 5. The ID code 51 read from the electronic tag 5 by the image pickup apparatus 1 is caused to be related to the captured image from the image pickup apparatus 1 and its date and time information and then is stored. The rewrite flag 64 is a flag which shows the image pickup apparatus 1 whether to permit the image data to be written into the electronic tag 5. Only when the rewrite flag 64 is set, the image pickup apparatus 1 can write the captured image into the electronic tag 5.

Next, an example of use of the system and its operation will be explained.

First, an electronic tag 5 is attached to an article 4 to be managed using an electronic tag. In a state where an object can be identified, for example, before a display, the object is captured with the image pickup apparatus 1 and the electronic tag information is read from the electronic tag 5. On the basis of the electronic tag information, the image pickup apparatus 1 requires the database management server 2 for permission for writing. If obtaining permission to write the captured image, the image pickup apparatus 1 writes image data about the captured image into the electronic tag 5.

In this state, when the electronic tag information is read from the electronic tag 5 by the tag reader/writer 6 to manage articles, an image based on the image data included in the electronic tag information is displayed on the tag reader/writer 6. This enables the operator to easily recognize which article the read-out electronic tag information is related to, even if there are a plurality of articles near the tag reader/writer 6, and take a suitable step.

Figure 7:
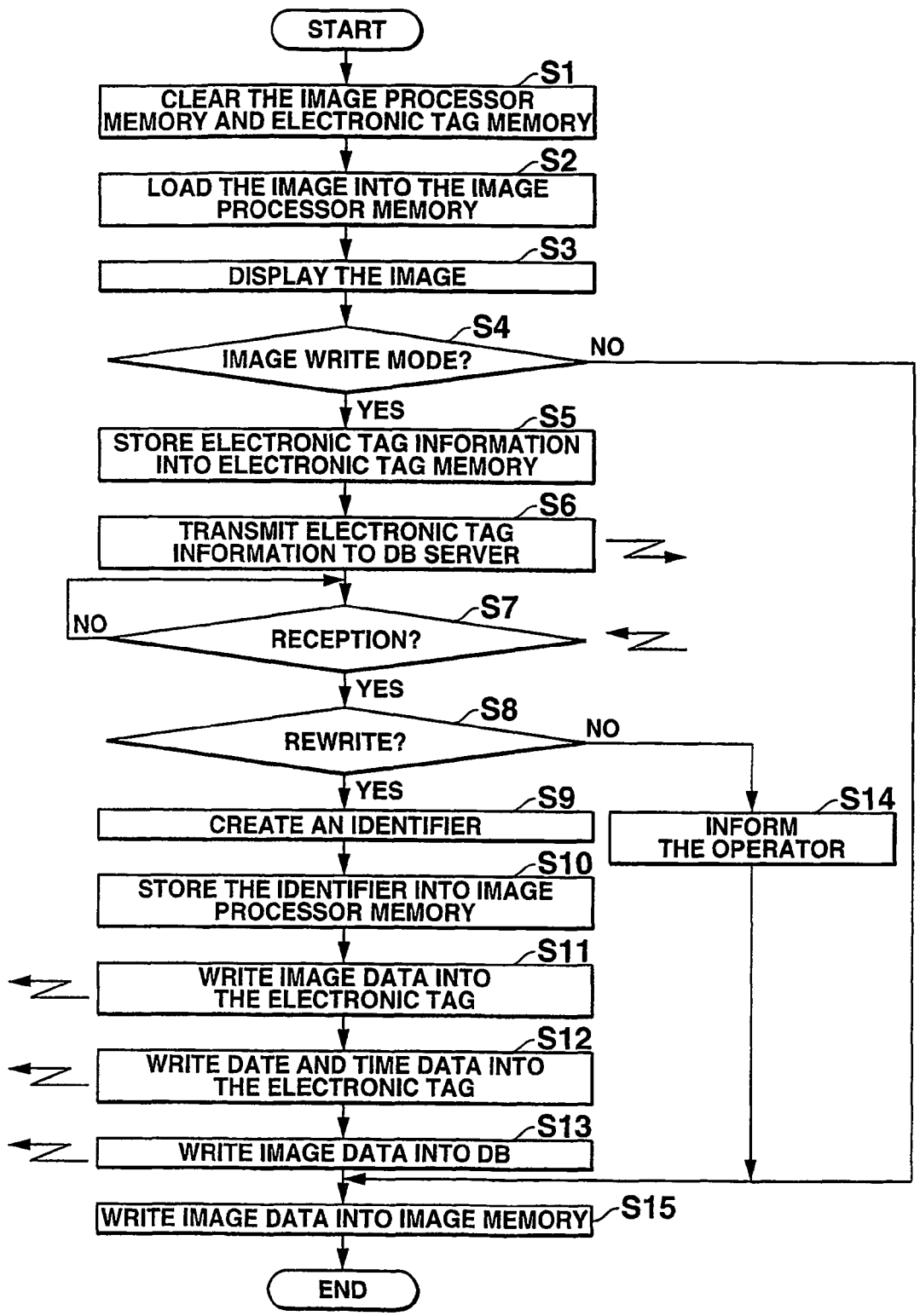
FIG. 7 is a flowchart to help explain the operation of the image pickup apparatus.

FIG. 7 is a flowchart to help explain the processes carried out by the image pickup apparatus 1. The processes of FIG. 7 are realized by executing the program stored in the internal memory of the input/output controller 26.

When the operator presses the shutter button 14, the process is started and the input/output controller 26 clears the image processor memory 29 and electronic tag memory 30 in an initializing process (step S1).

In step S2, the input/output controller 26 causes the imaging controller 24 to load the image data output from the A/D converter 13 into the image processor memory 29. In step S3, the input/output controller 26 displays a through image on the display device 18 on the basis of the image data.

In step S4, the input/output controller 26 checks the setting state of the mode button 6. As a result, if the mode switch 13 is set in the OFF state of the image write mode (No in step S4), the image pickup apparatus 1 neither reads the electronic tag information in the electronic tag 5 which an object to be captured has nor writes image data about the captured image. Therefore, in step S15, the input/output controller 26 writes the image data loaded into the image processor memory 29 into the image memory 32, and then the present process is ended.

In step S4, if the mode button 6 is set in the ON state of the image write mode (Yes in step S4), the input/output controller 26 causes the tag reader/writer 38 to read the electronic tag information from the electronic tag 5. In step S5, the input/output controller 26 causes the information to be transferred from the memory 382 of the tag reader/writer 38 to the electronic tag memory 30.

In step S6, the image pickup apparatus 1 transmits the electronic tag information read from the electronic tag 5 to the database management server 2 and makes an inquiry and thereafter goes into a reception wait state (No in step S7).

Then, if there is a response from the database management server 2 (Yes in step S7) and the contents of the response have shown that the rewrite of the image is not permitted (No in step S8), the operator, in step S14, is informed by, for example, displaying a guidance on the display 28 that the image cannot be rewritten. Thereafter, in step S15, the image data loaded into the image processor memory 29 is written into the image memory 32, which completes the present process.

In step S8, if the response from the database server 2 has shown that the rewrite of the image is permitted (Yes in step S8), the input/output controller 26 creates an electronic tag identifier on the basis of the ID code read from the electronic tag 5 in step S9 and stores the identifier into the image processor memory 29 (step S10).

In step S11, the input/output controller 26 writes image data into the electronic tag 5 and, in step S12, writes the system date and time clocked by the timer 36.

The input/output controller 26, in step S13, transmits image data to the database management server 2 and registers it in the database 3 and then, in step S15, writes the image data loaded into the image processor memory 29 into the image memory 32, which completes the present process.

As described above, in the image pickup apparatus 1 of the embodiment, when an image of an article is captured, an inquiry is made about permission to write the image. If permission is obtained, image data about the captured image is written into the electronic tag 5. Since the tag reader/writer 6 can also read the image data when reading the information from the electronic tag 5, displaying the image data enables the operator to recognize the article corresponding to the read-out information visually and easily.

Figure 8:
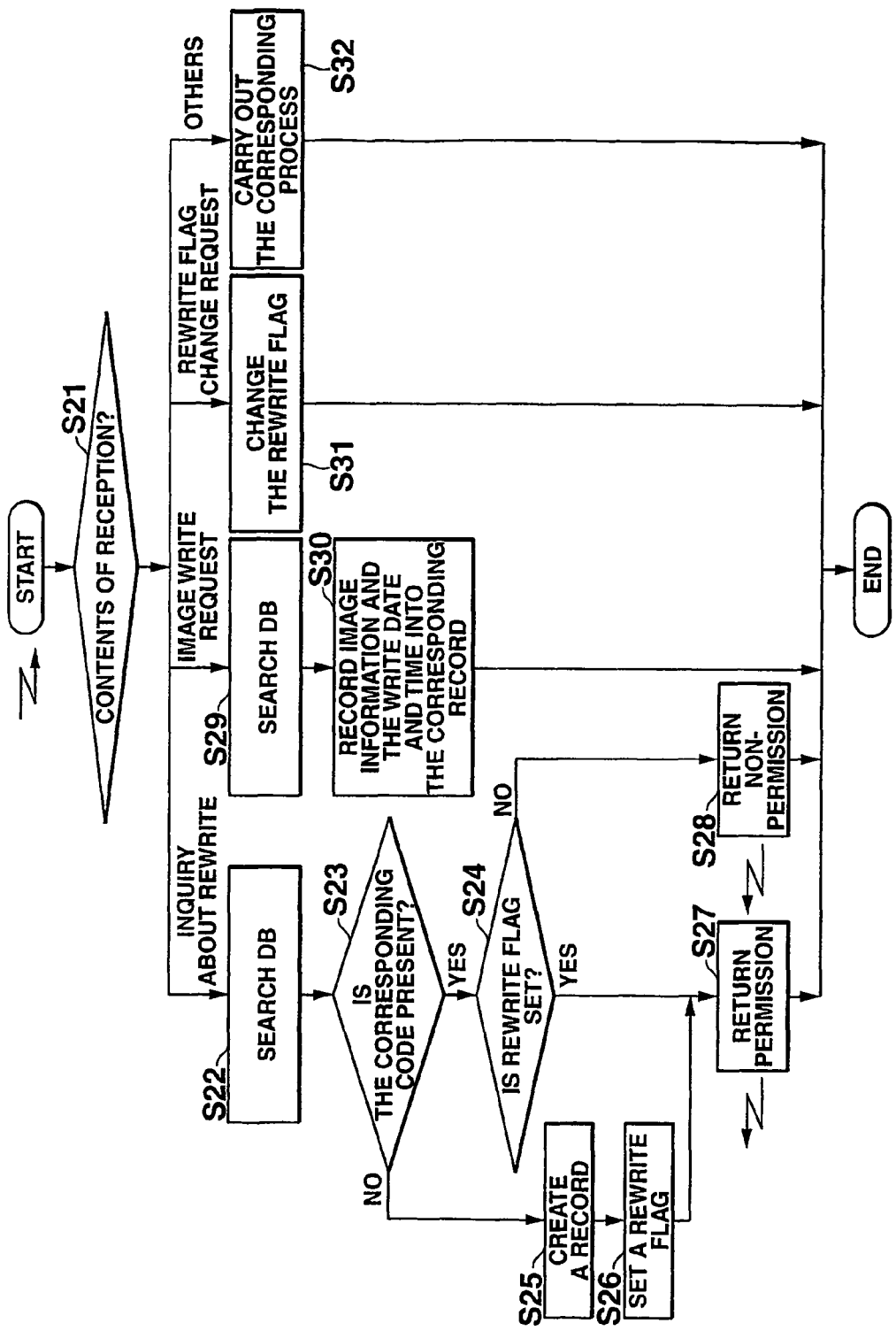
FIG. 8 is a flowchart to help explain the processes carried out by a database management server.

FIG. 8 is a flowchart to help explain the processes carried by the database management server 2. The processes of FIG. 8 are realized by executing the program stored in the internal memory of the CPU.

The process is started when an instruction or an inquiry is received from the image pickup apparatus 1 or the like. First, in step S21, the contents of the reception are checked.

As a result, if the contents of the reception have shown that the image pickup apparatus 1 has made an inquiry about permission to rewrite the image data (step S21, inquiry about rewrite), the database 3, in step S22, is searched on the basis of the information in the received electronic tag information, such as the ID code, for the corresponding record. If there is no corresponding record (No in step S23), a new record is created in step S25 and a rewrite flag for the record is set (step S26). Then, control of the process is passed to step S27.

In step S23, if the corresponding record exists in the database 3 (Yes in step S23), the state of the rewrite flag in the record is checked in step S24. If the result has shown that no rewrite flag is set (No in step S24), this means that the image in the electronic tag 5 of the article cannot be rewritten. Therefore, in step S28, the image pickup apparatus 1 is informed that rewrite is not permitted and the process is ended. If in step S24, the rewrite flag for the corresponding record is set (Yes in step S24); this means that the image in the electronic tag 5 of the article is permitted to be rewritten. Therefore, in step S27, the image pickup apparatus 1 is informed that rewrite is permitted and the process is ended.

Furthermore, in step S21, if the contents of the reception have shown an image write request made by the image pickup apparatus 1 (step S21, image write request), the database 3, in step S29, is searched on the basis of the ID code or the like for the corresponding record. Then, in step S30, the image information and write date and time are recorded into the record, which completes the present process.

Moreover, in step S21, if the contents of the reception have shown a rewrite flag change request made by the manager (step S21, rewrite flag change request), the setting of the rewrite flag for the specified record is changed in step S31. Then, the present process is ended. If the contents of the reception have shown another process request (step S21, others), a process corresponding to the process request is carried out. Thereafter, the present process is ended.

As described above, in the embodiment, permission to rewrite the image data stored in the electronic tag 5 is managed at the database 3. This prevents the image data in the electronic tag 5 from being rewritten carelessly.

Figure 9:
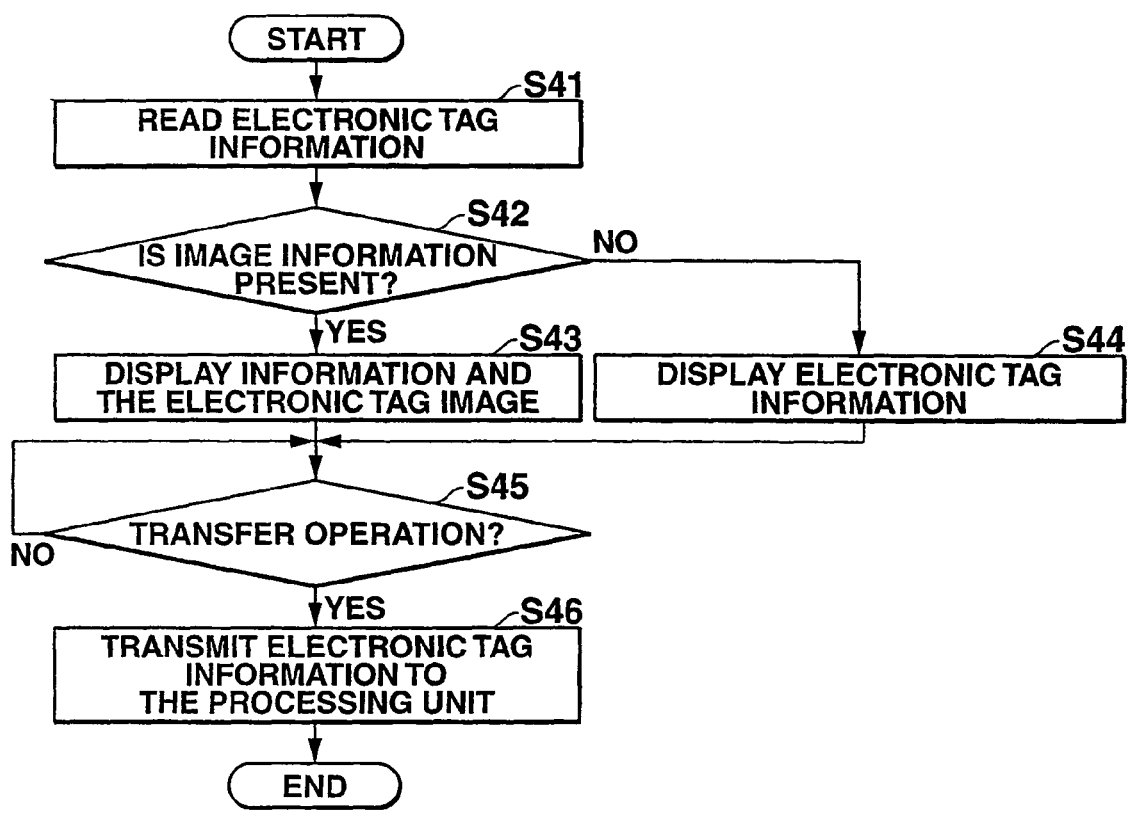
FIG. 9 is a flowchart to help explain the processes carried out by the tag reader/writer.

FIG. 9 is a flowchart to help explain the processes carried out by the tag reader/writer 6. The processes of FIG. 9 are realized by executing the program stored in the internal memory of the controller 44.

First, in step S41, the controller 44 causes the transmitter/receiver 42 to transmit an electronic tag information reading request and read the electronic tag information from the electronic tag 5 by converting the received radio wave into data. If there is no image data included in the electronic tag information (No in step S42), only the information corresponding to the management information (tag information in FIG. 5) in the electronic tag information is displayed in step S44. If there is image data included in the electronic tag information (Yes in step S42), the management information read from the electronic tag memory 30 is added, for example, superimposed on an image based on the image data, thereby displaying both of them on the display device 45.

After the image is displayed this way, the tag reader/writer 6 goes into the transfer wait state (No in step S45). If the operator inputs a transfer instruction from the input device 46 (Yes in step S45), the electronic tag information is transmitted to the processor unit 7 in step S46, which completes the present process.

As described above, in the image pickup apparatus 1 of the embodiment, if image data is included in the electronic tag 5, an image is displayed on the basis of the image data. This enables the operator to easily determine which article the read-out information is related to.

The image pickup apparatus 1 of the embodiment may be constructed not only as a single apparatus but also as a part of anther apparatus.

While in the embodiment, the electronic tag information read from the electronic tag 5 attached to an article is stored and managed in such a manner the tag information is related to the captured image, the electronic tag information may be stored and managed in such a manner that the tag information is related to another type of information that enables the article to be identified easily, such as audio data, moving picture data, or text data. Alternatively, the electronic tag information may be stored and managed in such a manner that the tag information is related to one or more of still pictures and audio data.

Furthermore, in the embodiment, when an image is captured by the image pickup apparatus 1, the database management server is asked for permission to write an image. To simplify the system, the system may be so configured that image data is written into the electronic tag 5 without asking the database management server for permission.

Moreover, in the embodiment, image data to identify an article has been stored into the electronic tag 5. Instead of storing image data into the electronic tag 5, the ID code read from the electronic tag 5 by the tag reader/writer 6 may be transmitted to the database 6 for inquiry and, on the basis of the obtained image data, an image of the article may be displayed.

According to the embodiment of the invention, an image pickup apparatus comprises an image capture device which captures an image of an article, an electronic tag reader which reads electronic tag information from an electronic tag, and a writing device, when the image of the article is captured by the image capture device, which writes the image of the article captured by the image capture device into the electronic tag.

According to the embodiment, image data about the captured image is stored into the electronic tag. When the electronic tag information is read next time, the image data can be also read, which enables an image to be displayed on the basis of the image data.

There is further provided a decision unit which determines whether a writing of the image is permitted. The writing device may write the image into the electronic tag when the decision unit determines that a writing of the image is permitted. For example, the decision unit transmits the electronic tag information read by the electronic tag reader to a server and makes a determination based on a response from the server. This prevents an image without permission from being updated.

According to the embodiment of the present invention, when the electronic tag information is read from the electronic tag, it is possible to provide the operator with information that identifies an article, such as an image of an article managed using its electronic tag, which enables the operator to easily identify the article corresponding to the read-out information.

The invention claimed is:

1. An image capture apparatus comprising:
   an image capture device which captures image data of an article;
   a display device which displays the image data of the article captured by the image capture device;
   an electronic tag reader which reads electronic tag information from an electronic tag, which is attached to the article, when the image capture device captures the image data of the article;
   a determining device which determines whether or not writing of the image data of the article captured by the image capture device into the electronic tag is permitted based on the electronic tag information read by the electronic tag reader; and
   an electronic tag writer which writes the image data of the article captured by the image capture device into the electronic tag when the determining device determines that the writing of the image data is permitted.

2. The image capture apparatus according to claim 1, further comprising a communication interface which transmits the electronic tag information read by the electronic tag reader to a management server, wherein the determining device determines whether or not writing of the image data of the article captured by the image capture device into the electronic tag is permitted by transmitting the electronic tag information read by the electronic tag reader to the management server via the communication interface and by receiving a response indicating whether or not writing is permitted from the management server.

3. The image capture apparatus according to claim 1, further comprising a managing unit which manages the electronic tag information by causing the captured image data and the read electronic tag information to relate to each other in a database.

4. A system comprising:
   an image capture apparatus; and
   a management server connected to the image capture apparatus via a network, wherein the management server manages electronic tag information read or written by the image capture apparatus and image data captured by the image capture apparatus;
   wherein the management server comprises:
      a receiving unit which receives, from the image capture apparatus, electronic tag information which is obtained by reading electronic tag information from an electronic tag attached to an article by an electronic tag reader in the image capture apparatus, and inquire information inquiring whether or not writing of the image data of the article captured by the image capture apparatus into the electronic tag is permitted;
      a database which stores data permitting or prohibiting the writing of the image data as record data corresponding to the electronic tag information; and
      a transmitting unit which searches the database when the receiving unit receives the electronic tag information and the inquire information, and which transmits to the image capture apparatus a notification indicating that the writing of the image data into the electronic tag is permitted when the database stores record data permitting the writing of the image data corresponding to the received electronic tag information, and
   wherein the image capture apparatus comprises an electric tag writer which writes the image data of the article captured by the image capture apparatus into the electronic tag, after the notification indicating that the writing of the image data is permitted is received.

5. A computer readable medium having a computer program stored thereon that is executable by a controller of an image capture apparatus to control the image capture apparatus to perform functions comprising:

capturing image data of an article;

displaying the captured image data of the article;

reading electronic tag information from an electronic tag which is attached to the article, when the image data of the article is captured;

determining whether or not writing of the captured image data of the article into the electronic tag is permitted based on the read electronic tag information; and writing the captured image data of the article into the electronic tag when it is determined that the writing of the image data is permitted.

* * * * *